(12) United States Patent
Tamagawa

(10) Patent No.: US 12,434,634 B2
(45) Date of Patent: Oct. 7, 2025

(54) DISPLAY CONTROL DEVICE

(71) Applicant: TOYOTA JIDOSHA KABUSHIKI KAISHA, Toyota (JP)

(72) Inventor: Shuichi Tamagawa, Kitanagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 98 days.

(21) Appl. No.: 18/521,353

(22) Filed: Nov. 28, 2023

(65) Prior Publication Data

US 2024/0246486 A1 Jul. 25, 2024

(30) Foreign Application Priority Data

Jan. 25, 2023 (JP) ................................ 2023-009488

(51) Int. Cl.
  *B60R 1/22* (2022.01)
  *B62D 15/02* (2006.01)

(52) U.S. Cl.
  CPC .............. *B60R 1/22* (2022.01); *B62D 15/029* (2013.01); *B60R 2300/00* (2013.01); *B60R 2300/308* (2013.01)

(58) Field of Classification Search
  CPC . B60R 1/22; B60R 2300/00; B60R 2300/308; B62D 15/029
  See application file for complete search history.

(56) References Cited

U.S. PATENT DOCUMENTS

| | | | |
|---|---|---|---|
| 10,836,313 B2* | 11/2020 | Nowakowski | B60R 1/24 |
| 11,112,791 B2* | 9/2021 | Bhanushali | G05D 1/0022 |
| 11,215,982 B2 | 1/2022 | Urano et al. | |
| 11,325,618 B2 | 5/2022 | Umeda | |
| 11,433,894 B2* | 9/2022 | Yamaguchi | B60W 60/00272 |
| 12,097,806 B2* | 9/2024 | Huenink | B60R 1/22 |
| 12,179,590 B2* | 12/2024 | Jung | H04N 5/262 |
| 2005/0187675 A1* | 8/2005 | Schofield | B60R 1/12 701/1 |
| 2008/0094250 A1* | 4/2008 | Myr | G08G 1/081 340/909 |

(Continued)

FOREIGN PATENT DOCUMENTS

| | | | |
|---|---|---|---|
| JP | 2004-021514 A | 1/2004 | |
| JP | 2024-105001 | * 8/2020 | ............... G08G 1/09 |
| JP | 2021-043523 A | 3/2021 | |

*Primary Examiner* — Carl C Staubach
(74) *Attorney, Agent, or Firm* — Sughrue Mion, PLLC

(57) ABSTRACT

A display control device is configured to control image display of a display device for remote operation of a moving body by a remote operator. The display device includes a first screen that displays an intersection image captured by a camera installed at an intersection and imaging a traffic situation in an area of the intersection. The display control device includes one or more sensors configured to acquire intention information of the remote operator regarding right and left turns of the moving body, and a processor. The processor determines, in accordance with a traveling direction of the moving body in the intersection image and the intention information, a shape of a course image indicating a planned course of the moving body, and displays the course image in a superimposed manner on the intersection image while associating the course image with the moving body in the intersection image.

4 Claims, 6 Drawing Sheets

(56) References Cited

U.S. PATENT DOCUMENTS

| | | | |
|---|---|---|---|
| 2018/0025647 A1* | 1/2018 | Krnja | G08G 1/166 |
| | | | 340/905 |
| 2019/0137999 A1 | 5/2019 | Taguchi et al. | |
| 2020/0086789 A1* | 3/2020 | Nowakowski | B60R 1/24 |
| 2020/0209888 A1 | 7/2020 | Sakai et al. | |
| 2020/0309560 A1* | 10/2020 | Matsunaga | B60K 35/26 |
| 2020/0326702 A1 | 10/2020 | Iwamoto et al. | |
| 2021/0041894 A1* | 2/2021 | Urano | G05D 1/0223 |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |
| 2022/0091268 A1* | 3/2022 | Sasaki | G01S 17/894 |
| 2022/0301427 A1* | 9/2022 | Ueno | H04N 7/18 |
| 2022/0311974 A1* | 9/2022 | Huenink | H04N 23/60 |
| 2024/0135667 A1* | 4/2024 | Bhanushali | G06V 10/273 |
| 2024/0251059 A1* | 7/2024 | Tamagawa | G06T 3/60 |
| 2024/0251060 A1* | 7/2024 | Tamagawa | H04N 7/18 |
| 2024/0345588 A1* | 10/2024 | Niiuchi | B60R 1/22 |

\* cited by examiner

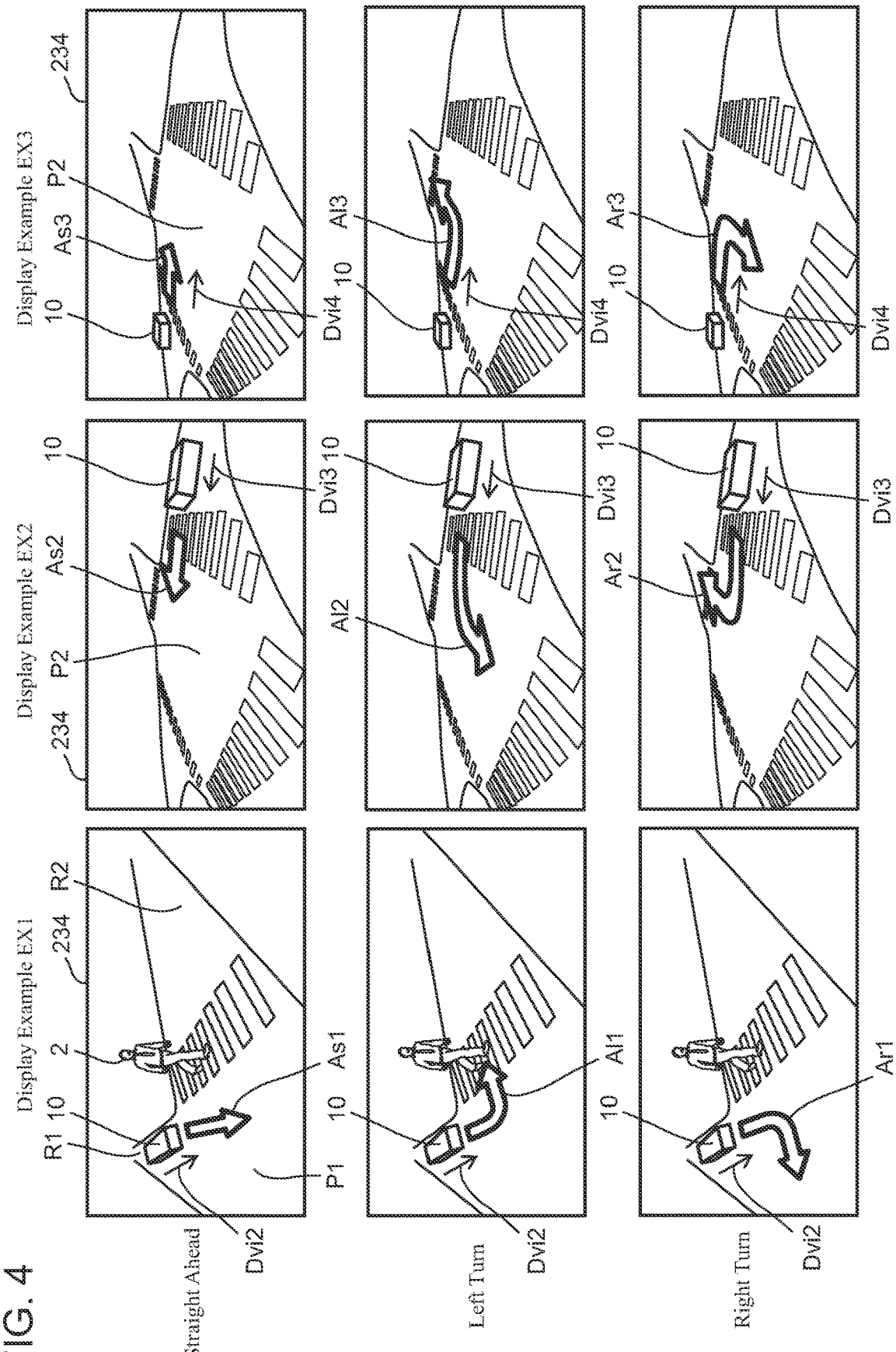

DISPLAY CONTROL DEVICE

CROSS-REFERENCES TO RELATED APPLICATION

The present disclosure claims priority under 35 U.S.C. § 119 to Japanese Patent Application No. 2023-009488, filed on Jan. 25, 2023, which is incorporated herein by reference in its entirety.

TECHNICAL FIELD

The present disclosure relates to a display control device for remote operation of a moving body.

BACKGROUND

JP 2004-021514 A discloses a traffic information display system including an information display device mounted on a vehicle. This information display device obtains a direction of the course of the subject vehicle in the received captured image from map information of a selected point and a received camera parameter, and combines the information indicating the direction of the course with the captured image to display the combined image on a screen.

Moreover, JP 2021-043523 A discloses a system for remotely instructing an automated driving vehicle. This system sets, as a limited information range, a range of sensor information to be transmitted from the vehicle to a remote commander based on an external situation and a course of the automated driving vehicle.

SUMMARY

In order to confirm safety of a remote operator during remote operation (remote driving or remote assistance) of a moving body, such as an automobile, it is conceivable to display, on a screen of a display device of a remote operator terminal, an image of a camera installed at an intersection. In order to display this kind of image, it is required that the remote operator who views the image displayed on the display device can easily grasp the traffic situation while instantaneously grasping the course of the moving body in the image.

However, the "information indicating the direction of the course" combined with the captured image in the technique described in JP 2004-021514 A is determined based on the map information and the camera parameter, and is not determined so as to quickly reflect the course of the moving body currently considered by the driver of the subject vehicle (that is, the driver's intention regarding the course of the moving body).

Therefore, even if the technique of JP 2004-021514 A can be applied to the "remote operation of the moving body", the "information indicating the direction of the course" cannot appropriately display the course of the moving body according to the intention of the remote operator when the moving body passes through the intersection. Therefore, the technique described in JP 2004-021514 A leaves room for improvement in enabling the remote operator who performs the "remote operation of the moving body" to easily grasp a traffic situation while instantaneously grasping the course of the moving body in the image. This also applies to the technique described in JP 2021-043523 A.

The present disclosure has been made in view of the problem described above, and an object thereof is to provide a display control device that can improve the visibility of a remote operator with respect to image display of a display device for remote operation of a moving body when the moving body passes through an intersection.

A display control device according to the present disclosure is configured to control image display of a display device for remote operation of a moving body by a remote operator. The display device includes a first screen configured to display an intersection image captured by a camera. The camera is installed at an intersection through which the moving body passes and is configured to image a traffic situation in an area of the intersection. The display control device includes one or more sensors configured to acquire intention information of the remote operator regarding right and left turns of the moving body, and a processor. The processor is configured to: determine, in accordance with a traveling direction of the moving body in the intersection image and the intention information, a shape of a course image indicating a planned course of the moving body; and display the course image in a superimposed manner on the intersection image while associating the course image with the moving body in the intersection image.

According to the present disclosure, the visibility of the remote operator with respect to the image display of the display device for the remote operation of the moving body when the moving body passes through an intersection can be improved.

BRIEF DESCRIPTION OF DRAWINGS

FIG. 4 is a diagram illustrating a specific example of display of the intersection image according to an embodiment;

DETAILED DESCRIPTION

Figure 1:
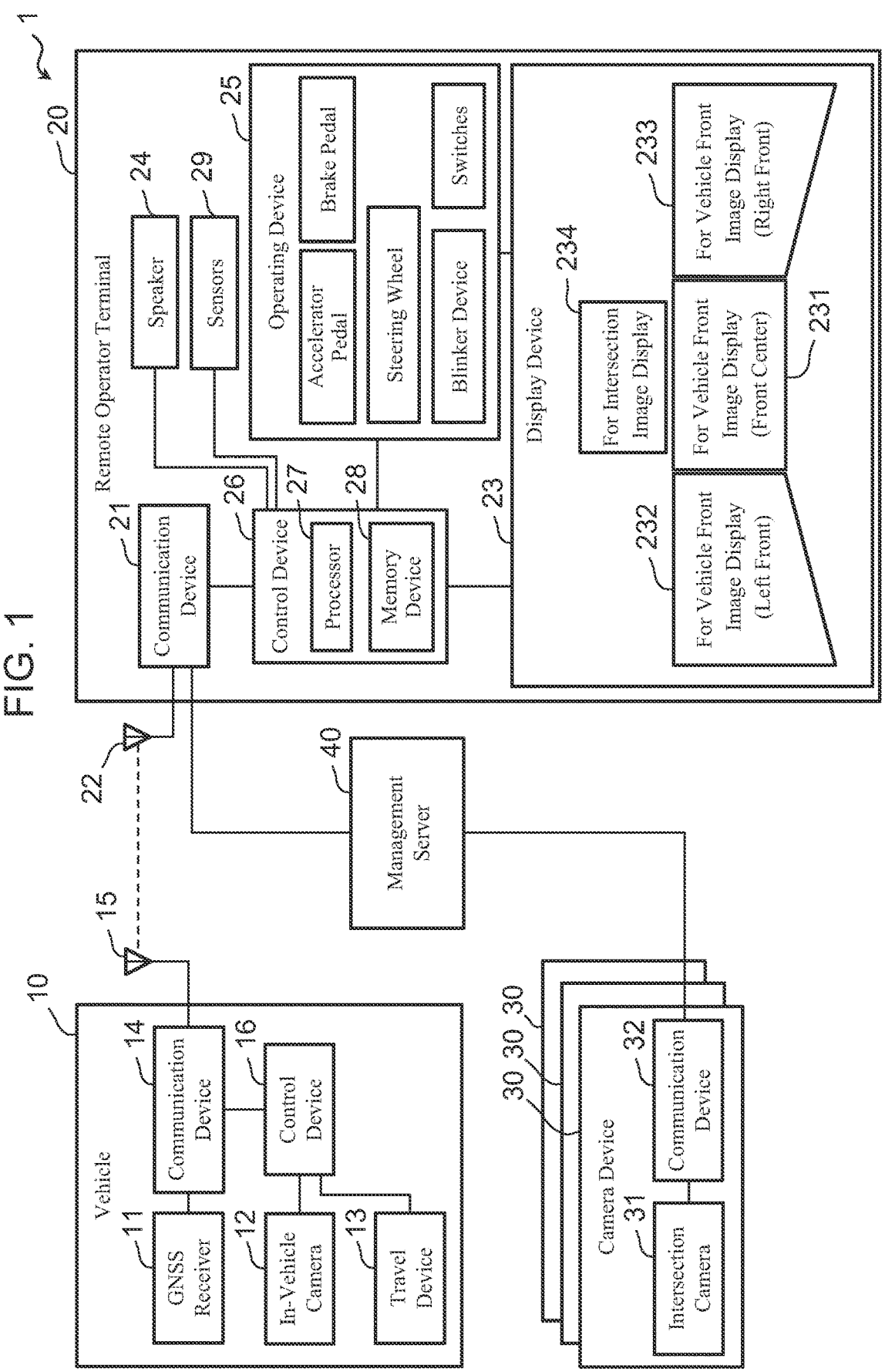
FIG. 1 is a diagram schematically illustrating a configuration example of a remote operation system to which a display control device according to an embodiment is applied.

Hereinafter, embodiments of the present disclosure will be described with reference to the accompanying drawings. In addition, common elements in the drawings are denoted by the same reference numerals, and redundant description thereof will be omitted or simplified.

1. Configuration of Remote Operation System

FIG. 1 is a diagram schematically illustrating a configuration example of a remote operation system 1 to which a display control device according to an embodiment is applied. The remote operation system 1 includes a vehicle 10, a remote operator terminal 20, a camera device 30, and a management server 40.

1-1. Vehicle

The vehicle 10 is an example of a "moving body" that is a target of "remote operation" according to the present disclosure, and more specifically, is, for example, an automobile. The vehicle 10 includes a global navigation satellite system (GNSS) receiver 11, one or more in-vehicle cameras (one or more moving body cameras) 12, a travel device 13, a communication device 14, an antenna 15, and a control device 16.

The GNSS receiver 11 is used to acquire a position and an orientation of the vehicle 10. The one or more in-vehicle cameras 12 recognize (detect) a situation around the vehicle 10. The one or more in-vehicle cameras 12 include cameras that capture images in front of the vehicle 10 (more specifically, for example, the front center, the left front, and the right front of the vehicle 10).

The travel device 13 includes a drive device, a brake device, and a steering device. The drive device includes, for example, at least one of an electric motor and an internal combustion engine for driving the vehicle 10. The brake device includes a brake actuator for braking the vehicle 10. The steering device includes, for example, an electric motor configured to steer wheels.

The communication device 14 communicates with the outside of the vehicle 10. Specifically, the communication device 14 communicates with, for example, the remote operator terminal 20 via the antenna 15.

The control device 16 is a computer configured to control the vehicle 10. The control device 16 includes one or more processors and one or more memory devices. The one or more processors execute various processes related to control of the vehicle 10. The one or more memory devices store various types of information necessary for the processes executed by the one or more processors.

During the remote operation of the vehicle 10, the control device 16 communicates with the remote operator terminal 20 via the communication device 14. The control device 16 transmits vehicle information VCL to the remote operator terminal 20. The vehicle information VCL is information necessary for the remote operation by the remote operator, and includes surrounding situation information of the vehicle 10. The surrounding situation information includes images captured by the in-vehicle cameras 12. The surrounding situation information may include sound detected by an in-vehicle microphone. The surrounding situation information may include object information related to a moving object around the vehicle 10. The object information indicates a relative position and a relative speed of an object with respect to the vehicle 10. Moreover, the vehicle information VCL may include vehicle state information, such as a speed, an acceleration, a yaw rate, and a steering angle of the vehicle 10, and vehicle position information.

Further, the control device 16 receives remote operation information from the remote operator terminal 20. The remote operation information is related to the remote operation by the remote operator. For example, the remote operation information includes the amount of operation by the remote operator. The control device 16 performs vehicle traveling control by controlling the travel device 13 in accordance with the received remote operation information.

1-2. Remote Operator Terminal

The remote operator terminal 20 is a terminal device used when the remote operator remotely operates the vehicle 10. The "remote operation" according to the present disclosure is a concept including "remote driving" in which a remote operator drives a moving body from a remote place, and "remote assistance" in which a remote operator assists the driving of a moving body from a remote place. In addition, when the remote operation is performed as the remote driving, the remote operator terminal 20 corresponds to a remote cockpit.

The remote operator terminal 20 includes a communication device 21, an antenna 22, a display device 23, a speaker 24, an operating device 25, and a control device 26.

The communication device 21 performs communication (wireless communication) with the vehicle 10 via the antenna 22. Further, the communication device 21 communicates with the management server 40.

The display device 23 presents various kinds of information to the remote operator by displaying the various kinds of information. The various kinds of information include images of intersection areas (intersection images) captured by a plurality of intersection cameras 31. That is, each of the intersection images is an image indicating the traffic situation in an area of the intersection into which the vehicle 10 enters.

FIG. 1 shows an example of a screen configuration of the display device 23 viewed from the remote operator. That is, the right side of the drawing sheet corresponds to the right side of the screen when viewed from the remote operator, and the left side of the drawing sheet corresponds to the left side of the screen when viewed from the remote operator. In this example, the display device 23 includes four monitors 231, 232, 233, and 234. The monitors 231, 232, and 233 display images in front of the vehicle 10 (vehicle front images) captured by the plurality of in-vehicle cameras 12. More specifically, as an example, one or more vehicle front images include a front center image displayed by the monitor 231, a left front image displayed by the monitor 232, and a right front image displayed by the monitor 233. As shown in FIG. 1, the monitor 232 is arranged on the left side of the monitor 231, and the monitor 233 is arranged on the right side of the monitor 231.

The monitor 234 displays an intersection image. As shown in FIG. 1, the monitor 234 is arranged above the monitors 231 to 233, for example. Specific examples of images displayed on the monitor 234 will be described below with reference to FIGS. 2A, 2B, 3A, 3B, 4, and 6. In addition, in the example illustrated in FIG. 1, the display device 23 includes one monitor (each of the monitors 231 to 234) for one image.

Additionally, in the example shown in FIG. 1, the screen of the monitor 234, and the screens of the monitors 231 to 233 correspond to the "first screen" and the "second screen" according to the present disclosure, respectively. Further, instead of the example illustrated in FIG. 1, the "display device" according to the present disclosure may include one monitor configured display both the vehicle front image and the intersection image. Furthermore, in the example shown in FIG. 1, one intersection image is displayed, but two or more intersection images may be displayed. For example, two intersection images may be arranged side by side on the left and right above monitors 231 to 233.

The speaker 24 presents sound information to the remote operator by outputting the sound information. The sound information includes the sound detected by the in-vehicle microphone described above.

The operating device 25 receives an input from the remote operator. For example, the operating device 25 includes one or more remote operation members operated by the remote operator when remotely operating the vehicle 10. The one or more remote operation members include an accelerator pedal, a brake pedal, a steering wheel, and a blinker device. In addition, the operating device 25 includes switches for other various operations related to the remote operation.

The control device 26 controls the remote operator terminal 20. The control device 26 includes one or more processors 27 (hereinafter, simply referred to as "processor 27") and one or more memory devices 28 (hereinafter, simply referred to as "memory device 28"). The processor 27 executes various processes. For example, the processor 27 includes a central processing unit (CPU). The memory device 28 stores various types of information necessary for the processes executed by the processor 27. The memory device 28 is, for example, at least one of a volatile memory, a nonvolatile memory, a hard disk drive (HDD), and a solid state drive (SSD).

Remote operation program is a computer program executed by the processor 27. The function of the control device 26 is realized by the processor 27 executing the remote operation program. The remote operation program is stored in the memory device 28. Alternatively, the remote operation program may be recorded in a computer-readable recording medium. The remote operation program may be provided via a network.

The control device 26 communicates with the vehicle 10 via the communication device 21. The control device 26 receives the vehicle information VCL transmitted from the vehicle 10. The control device 26 presents the vehicle information VCL to the remote operator via the display device 23 and the speaker 24. For example, the control device 26 displays the images captured by the in-vehicle camera 12 on the display device 23. Further, the control device 26 outputs the sound detected by the in-vehicle microphone from the speaker 24. The remote operator can recognize the state of the vehicle 10 and the surrounding situation based on the vehicle information VCL.

The remote operator operates the remote operation members of the operating device 25. The operating amounts of the remote operation members are detected by sensors 29 provided in the remote operation members. The control device 26 generates the remote operation information reflecting the operating amounts of the remote operation members by the remote operator. Then, the control device 26 transmits the remote operation information to the vehicle 10 via the communication device 21. More specifically, the sensors 29 include sensors configured to detect operating amounts of the accelerator pedal, the brake pedal, and the steering wheel. The sensors 29 also include, for example, a sensor configured to detect an operating position of the blinker device (for example, a blinker lever) and a sensor configured to detects a line of sight (more specifically, for example, a position of the line of sight) of the remote operator who views the monitors 231 to 233 (that is, the vehicle front images).

1-3. Intersection Camera

The intersection camera 31 (hereinafter, also simply referred to as "camera 31") is installed at each intersection through which the vehicle 10 passes, and capture an image of an intersection area (more specifically, the inside of the intersection and the vicinity thereof). The camera 31 is configured as, for example, the camera device 30 including the camera 31 and a communication device 32. In the examples shown in FIGS. 2A, 2B, 3A, 3B, 4, and 6 described below, one camera 31 is installed for one intersection.

An image of an intersection area (intersection image) captured by each camera 31 is transmitted to the management server 40 via the communication device 32. The management server 40 is configured to be able to communicate with each camera device 30, and manages the intersection image transmitted from each camera device 30. The management server 40 is also configured to be able to communicate with the remote operator terminal 20. When the vehicle 10 approaches an intersection area, the control device 26 of the remote operator terminal 20 requests the management server 40 to transmit an image of the intersection area. In response to the request, the management server 40 transmits the image of the corresponding intersection area to the remote operator terminal 20.

Additionally, communication between the management server 40 and each camera device 30 may be either wired communication or wireless communication. This also applies to communication between the management server 40 and the remote operator terminal 20. Furthermore, unlike the example illustrated in FIG. 1, the acquisition of the intersection image by the remote operator terminal 20 may be performed by direct communication with each camera device 30 without going through the management server 40.

2. Control of Image Display on Display Device

In the remote operation system 1 described above, the control device 26 of the remote operator terminal 20 controls the image display of the display device 23 for the remote operation of the vehicle 10 (moving body). Therefore, the control device 26 corresponds to an example of the "display control device" according to the present disclosure.

When the image of the intersection camera 31 is displayed on the display device 23 for the safety confirmation by the remote operator, it is required for the display of the image requires that the remote operator viewing the image displayed on the display device 23 can easily grasp the traffic situation while instantaneously grasping a traveling direction Dv of the vehicle 10 in the image.

More specifically, as illustrated in FIG. 1, on the screen of the display device 23 installed in the remote operator terminal 20, the image from the in-vehicle camera 12 (vehicle front image) and the image from the intersection camera 31 (intersection image) are simultaneously displayed and mixed. The remote operator is required to view all of these multiple images. Also, the remote operator recognizes the space in the image and converts the space in his or her brain as necessary for the space recognition every time he or she puts his or her line of sight on each image. Moreover, the orientation of the intersection camera 31 (imaging direction Dc) and the installation location thereof vary depending on the environment of each intersection. Therefore, the intersection image of each intersection is affected by the differences in the orientation and the installation location of the intersection camera 31. Therefore, it is difficult to instantaneously determine the positional relation between a moving object, such as another vehicle or a pedestrian, in an intersection area and the vehicle 10 and instantaneously determine the moving direction of the moving object (for example, whether or not the moving object is approaching the vehicle 10) while instantaneously grasping the traveling direction Dv (more specifically, an "in-image traveling direction Dvi" described below) of the vehicle 10 in the intersection image.

Figure 2A:
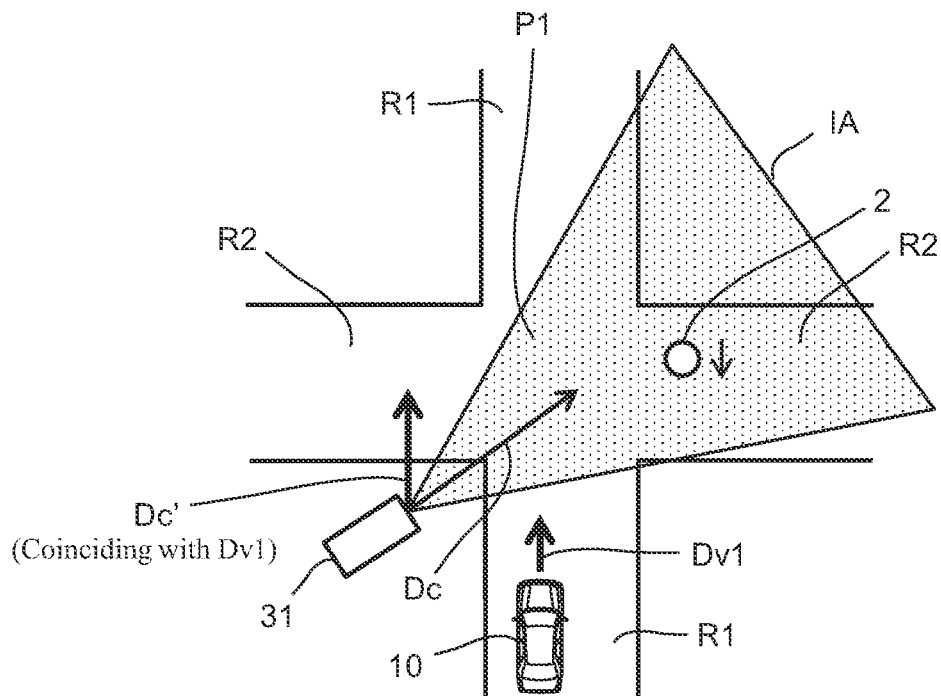
FIG. 2A is a diagram used to specifically describe a display example of the intersection image according to an embodiment.
Figure 2B:
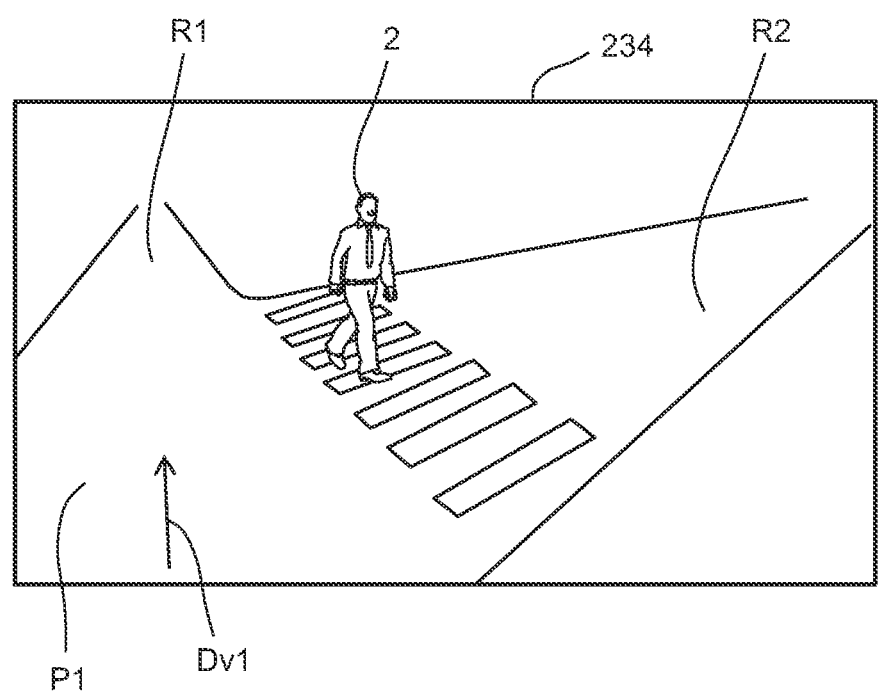
FIG. 2B is a diagram used to specifically describe the display example of the intersection image according to an embodiment.
Figure 3A:
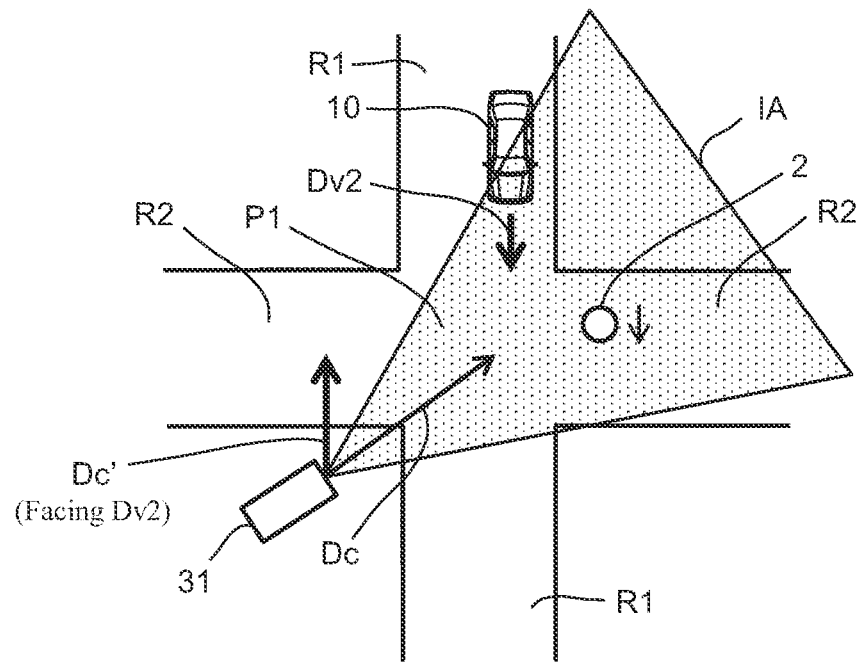
FIG. 3A is a diagram used to specifically describe an issue X.
Figure 3B:
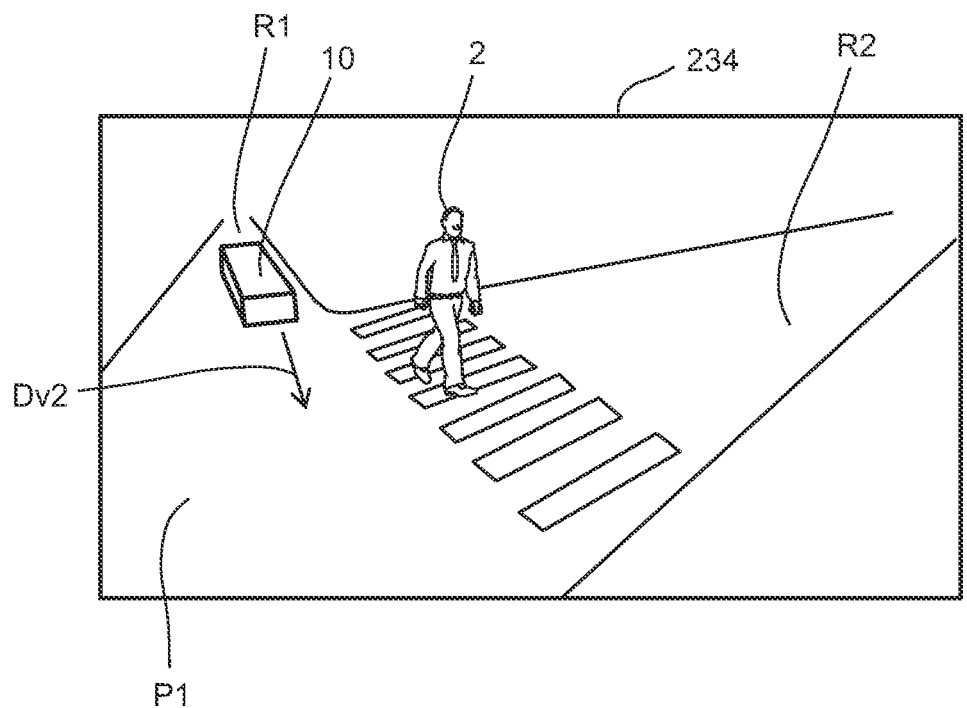
FIG. 3B is a diagram used to specifically describe the issue X.

FIGS. 2A and 2B are diagrams used to specifically describe a display example of the intersection image according to the embodiment, and FIGS. 3A and 3B are diagrams used to specifically describe an issue X. As shown in FIGS. 2A and 3A, this specific example will be described by taking, as an example, an intersection P1 where one intersection camera 31 is installed.

The area of the intersection P1 imaged by the camera 31 includes not only an area located in the intersection P1 but also a first road R1 on which the vehicle 10 travels and a second road R2 that intersects with the first road R1 at the intersection P1.

More specifically, first, FIG. 2A illustrates a traffic situation in the area of the intersection P1 when the vehicle 10 traveling on the first road R1 along a traveling direction Dv1 is approaching the intersection P1. In this situation, the camera 31 is located, for example, beside the first road R1 on the left side of the vehicle 10 when viewed from the vehicle 10. Also, the camera 31 captures not only the area in the intersection P1 but also an area of the second road R2 located on the right side of the intersection P1. A pedestrian 2 crossing the second road R2 is included in an imaging area IA of this camera 31. In addition, instead of the example described above, the installation location of the camera 31 may be, for example, inside the intersection P1.

FIG. 2B corresponds to the display of the intersection image on the display device 23 in the above-described situation shown in FIG. 2A. The intersection image shown in FIG. 2B corresponds to the image itself displayed on the screen of the display device 23 as it is in a state of being captured by the camera 31. In addition, an arrow of the traveling direction Dv1 shown in the intersection image in FIG. 2B is shown for reference of description, and is not included in the intersection image. The same applies to an arrow of a traveling direction Dv2 in FIG. 3B described below.

According to the intersection image shown in FIG. 2B, the pedestrian 2 who is present on the right side (more specifically, the right front side) of the vehicle 10 at the actual intersection P1 can be displayed on the screen of the monitor 234 so as to be seen from the remote operator in the same manner as the actual appearance. Therefore, the intersection image of the camera 31 can be displayed so as to have the same appearance as those of the vehicle front images displayed on the monitors 231 and 233.

Next, FIG. 3A shows a traffic situation in the area of the intersection P1 when the vehicle 10 traveling along the traveling direction Dv2 opposite to the traveling direction Dv1 shown in FIG. 2A is approaching the intersection P1. FIG. 3B corresponds to an example in which the image of the camera 31 is displayed as it is on the screen of the monitor 234 in the situation shown in FIG. 3A, similarly to the example shown in FIG. 2B. The intersection image shown in FIG. 3B also includes the vehicle 10.

According to the image display shown in FIG. 3B, in the intersection image, the pedestrian 2 that is present in the left front of the vehicle 10 at the actual intersection P1 as shown in FIG. 3A is displayed on the right side when viewed from the remote operator. As a result, when the display device 23 displays the intersection image shown in FIG. 3B together with the vehicle front image captured by the in-vehicle camera 12, the position of the pedestrian 2 in the intersection image is laterally opposite to the position of the pedestrian 2 in the vehicle front image. This prevents the remote operator from instantaneously grasping the traveling direction (in particular, the left-right direction) of the vehicle 10 in the intersection image.

In view of the issue X described above, in the present embodiment, the control device 26 (processor 27) causes the display device 23 to display the intersection image by the following manner. FIG. 4 is a diagram illustrating a specific example of the display of the intersection image according to the embodiment. More specifically, FIG. 4 illustrates, for each of three display examples EX1, EX2, and EX3, display examples (upper, middle, and lower) respectively corresponding to straight ahead, right turn, and left turn. In addition, arrows of the traveling direction Dvi (Dvi2 to Dvi4) shown in each intersection image in FIG. 4 are shown for reference of description, and are not included in the intersection image.

The control device 26 displays, in a superimposed manner on the intersection image, a "course image (object) A" indicating a planned course of the vehicle 10 when passing through the intersection while associating the course image A with the vehicle 10 in the intersection image. In other words, the control device 26 superimposes and displays the course image A on the intersection image captured by the camera 31 by an augmented reality (AR) technique.

To be specific, in the present embodiment, the shape of the course image A displayed so as to be superimposed on the intersection image is determined based on the traveling direction Dv of the vehicle 10 in the intersection image (hereinafter, also referred to as "in-image traveling direction Dvi" for convenience) and "intention information II" of the remote operator. In other words, the course image A to be superimposed and displayed is selected from three of a course image As indicating the straight ahead, a course image Ar indicating the right turn, and a course image Al indicating the left turn in accordance with the in-image traveling direction Dvi and the intention information II. More specifically, in each example illustrated in FIG. 4, the course image A indicates the direction of the course using an arrow.

The intention information II is information on the intention of the remote operator regarding right and left turns of the vehicle 10, and is acquired using the sensors 29 described above. The intention information II is, for example, blinker operation information. This blinker operation information is information indicating that the operating position of the blinker device operated by the remote operator is the neutral position, the right turn instruction position, or the left turn instruction position. In addition, the intention information II includes operation information of the remote operator, and the blinker operation information is an example of the operation information of the remote operator.

The display example EX1 corresponds to the display of the intersection image in the situation shown in FIG. 3A described above. When the blinker device is not operated by the remote operator (that is, when the blinker device is in the neutral position) when the vehicle 10 enters the intersection P1, a course image As1 indicating the straight ahead is selected. As shown in FIG. 4, the direction indicated by the course image As1 is determined so as to be a direction along an in-image traveling direction Dvi2.

On the other hand, when the blinker device is operated by the remote operator when the vehicle 10 enters the intersection P1, the course image A associated with the operation is selected. That is, when the blinker device is operated to the left turn instruction position, a course image Al1 indicating the left turn is selected. Further, when the blinker device is operated to the right turn instruction position, a course image Ar1 indicating the right turn is selected. Furthermore, as shown in FIG. 4, the direction indicated by the course image Al1 or Ar1 is determined so as to be a direction along the in-image traveling direction Dvi2.

Additionally, as shown in FIG. 4, based on the information of the intersection image, the control device 26 arranges the course image As1, Al1, or Ar1 so as to be displayed in a superimposed manner in front of the vehicle 10 in the intersection image. More specifically, in order to improve the visibility of the remote operator, the superimposed display of the course image A is performed while three-dimensionally changing the angle of the course image A in accordance with the angle of view of the intersection camera 31.

The superimposed display of the course image A in each of the other display examples EX2 and EX3 is also executed based on the same concept as that of the display example EX1 described above. The display example EX2 and the display example EX3 are different from each other in the traveling direction Dv with respect to an intersection P2 while targeting the intersection image of the same intersection P2. To be more specific, as shown in FIG. 4, in the display example EX2, the direction indicated by a course image As3, Al2, or Ar2 is determined so as to be a direction along an in-image traveling direction Dvi3, and the course image As2, Al2, or Ar2 is selected in accordance with the blinker operation information. Similarly, in the display example EX3, the direction indicated by a course image As3, Al3, or Ar3 is determined so as to be a direction along an in-image traveling direction Dvi4, and the course image As3, Al3, or Ar3 is selected in accordance with the blinker operation information.

Moreover, the intention information II may be, for example, information indicating the operating amount (for example, rotation angle) of the steering wheel operated by the remote operator, instead of the blinker operation information described above. This kind of operation information of the steering wheel corresponds to another example of the operation information of the remote operator. To be specific, when the steering wheel is in the neutral state at the time of entering an intersection, the course image As indicating the straight ahead is selected. On the other hand, when the steering wheel is turned in the left turning direction at the time of entering an intersection, the course image Al indicating the left turn is selected. Further, when the steering wheel is turned in the right turning direction, the course image Ar indicating the right turn is selected.

Furthermore, the intention information II is not necessarily limited to the operation information of the remote operator, and may be, for example, information of the line of sight (for example, position information of the line of sight) of the remote operator who views the vehicle front images displayed on the monitors 231 to 233. To be more specific, for example, when the remote operator turns his/her line of sight to the vehicle front image in the central monitor 231 at the time of entering the intersection, the course image As indicating the straight ahead is selected. On the other hand, when the remote operator turns his/her line of sight to the vehicle front image in the left-side monitor 232 at the time of entering the intersection, the course image Al indicating the left turn is selected. Further, when the remote operator turns his/her line of sight to the vehicle front image in the right-side monitor 233 at the time of entering the intersection, the course image Ar indicating the right turn is selected.

Figure 5:
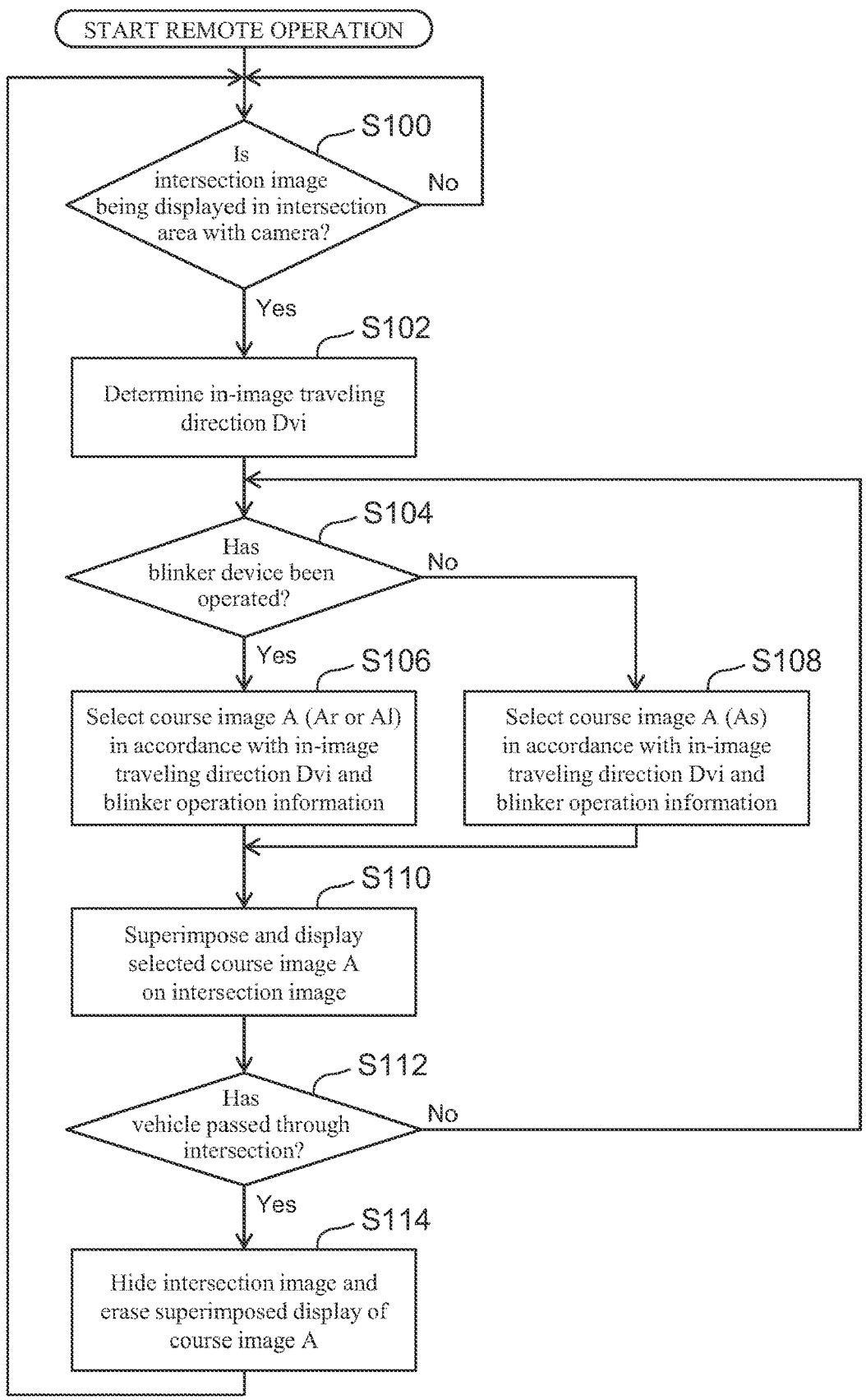
FIG. 5 is a flowchart illustrating an example of a flow of processing regarding image display according to an embodiment.

FIG. 5 is a flowchart illustrating an example of a flow of processing regarding the image display according to the embodiment. The processing of this flowchart is started when the remote operation of the vehicle 10 is started, and is ended when the remote operation is ended.

In step S100, the control device 26 (processor 27) determines whether or not an intersection image is being displayed in an intersection area where the intersection camera 31 is installed. The display of the intersection image is started, for example, when the control device 26 determines, based on the vehicle position information transmitted from the vehicle 10, that the vehicle 10 has approached the intersection. That is, the display is started immediately before entering the intersection. When this determination result is Yes, the processing proceeds to step S102.

In step S102, the control device 26 determine the in-image traveling direction Dvi of the vehicle 10 in the intersection image based on the imaging direction Dc of the camera 31 and the traveling direction Dv of the vehicle 10. The information of the imaging direction Dc used for this determination is acquired from the camera device 30 together with the intersection image, for example. Also, the traveling direction Dv used for this determination is calculated based on the vehicle position information, for example.

Next, in step S104, the control device 26 determines whether or not the blinker device has been operated based on the information from the sensors 29. As a result, when this determination result is Yes (that is, when the right turn instruction operation or the left turn instruction operation is performed), the processing proceeds to step S106, and when the determination result is No (that is, when there is no operation), the processing proceeds to step S108. In addition, in the example in which the operation information of the steering wheel is used as the intention information II, it is determined whether or not the operation of the steering wheel is performed. In the example in which the information of the line of sight of the remote operator is used, it is determined whether or not the movement of the line of sight of the remote operator in the left-right direction is performed.

In step S106, the control device 26 selects the course image Ar or Al in accordance with the in-image traveling direction Dvi and the blinker operation information (information on the right turn instruction operation or the left turn instruction operation). On the other hand, in step S108, the control device 26 selects the course image As in accordance with the in-image traveling direction Dvi and the blinker operation information (information indicating the straight ahead).

Then, in step S110, the control device 26 displays the course image A selected in step S106 or S108 so as to be superimposed on the intersection image displayed on the display device 23. Then, in step S112, the control device 26 determines whether or not the vehicle 10 has passed through the intersection (more specifically, the intersection subject to the determination in step S100) based on, for example, the vehicle position information.

As a result, while the vehicle 10 has not yet passed through the intersection described above, the display of the intersection image accompanied by the superimposed display of the course image A by the processing in and after step S104 is continued. On the other hand, after the vehicle 10 has passed through the intersection, the control device 26 proceeds to step S114 and hides the intersection image corresponding to the intersection and erases the superimposed display of the course image A.

As described above, according to the present embodiment, the "course image A" indicating the planned course of the vehicle 10 when passing through the intersection is displayed so as to be superimposed on the intersection image while being associated with the vehicle 10 in the intersection image. Then, the shape of the course image A is determined based on the in-image traveling direction Dvi and the intention information II. Accordingly, it is possible to quickly reflect the intention of the remote operator regarding the right or left turn of the vehicle 10 on the superimposed display of the course image A. Therefore, the remote operator can intuitively and easily grasp the course of the vehicle 10 in the intersection image. As described above, according to the present embodiment, when the vehicle 10 passes through the intersection, the visibility of the image display of the display device 23 for the remote operation of the vehicle 10 by the remote operator can be improved.

Additionally, as illustrated in FIG. 4, according to the course image A, since the direction of the course of the vehicle 10 in the intersection image is displayed by an arrow, the remote operator can easily draw his/her attention ahead the course. That is, it is possible to make it easy for the remote operator to recognize the direction of the course.

Furthermore, according to the present embodiment, real-time intention information II can be acquired from the blinker operation information which is the operation information of the remote operator. The same applies to an example in which the operation information of the steering wheel is used as the operation information of the remote operator and an example in which the information of the line of sight of the remote operator is used instead of the operation information of the remote operator.

3. Additional Image Process (Horizontal Flip)

Figure 6:
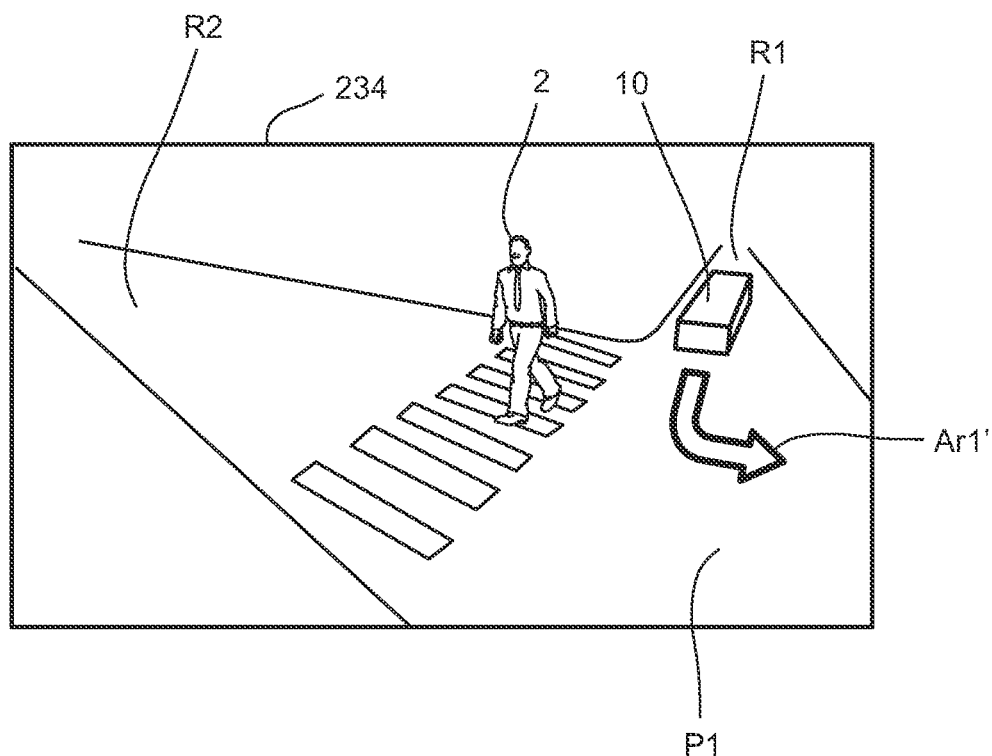
FIG. 6 is a diagram used to describe an additional image process according to an embodiment.

With respect to the issue X described above, the control device 26 may additionally execute the following image process IP together with the superimposed display of the course image A described above. FIG. 6 is a diagram used to describe the additional image process IP according to the embodiment together with FIGS. 2A, 2B, 3A, and 3B described above. In addition, FIG. 6 shows an intersection image at the same time point as the intersection image shown in FIG. 3B.

According to the image process IP, first, it is determined whether the imaging direction Dc of the camera 31 coincides with or faces the traveling direction Dv of the vehicle 10. More specifically, a direction Dc' (see FIG. 2A and FIG. 3A) of a vehicle-traveling-direction element of a vector that indicates the imaging direction Dc is compared with the traveling direction Dv (Dv1 or Dv2). The direction Dc' is calculated based on the imaging direction Dc and the traveling direction Dv.

As a result, when the imaging direction Dc (direction Dc') coincides with the traveling direction Dv as in the example shown in FIG. 2A, the control device 26 displays the intersection image acquired from the intersection camera 31 at a designated cycle on the screen of the display device 23 as it is without flipping the intersection image horizontally (see FIG. 2B).

On the other hand, when the imaging direction Dc (direction Dc') faces the traveling direction Dv as in the example shown in FIG. 3A, the control device 26 displays the intersection image on the screen while horizontally flipping the image acquired from the camera 31 (see FIG. 6). In addition, in FIG. 6, as an example of the course image A based on the intention information II, a course image Ar1' related to the right turn is superimposed and displayed on the intersection image. When the intersection image is flipped horizontally by the image process IP, the course image A is also flipped horizontally as in the course image Ar1' shown in FIG. 6.

According to the image process IP described above, the intersection image displayed on the screen when the vehicle 10 enters the intersection P1 from the traveling direction Dv2 (second direction) opposite to the traveling direction Dv1 is flipped horizontally as shown in FIG. 6 with respect to the intersection image (see FIG. 2B) displayed on the screen when the vehicle 10 enters the intersection P1 from the traveling direction Dv1 (first direction).

As a result, when the traveling direction Dv is Dv1, the pedestrian 2 displayed on the right side (right front side) of the vehicle 10 in the vehicle front image showing the actual traffic situation can be displayed on the right side similarly in the intersection image as shown in FIG. 2B. Further, when the traveling direction Dv is Dv2, the pedestrian 2 displayed on the left side (left front side) of the vehicle 10 in the vehicle front image showing the actual traffic situation can be displayed on the left side similarly in the intersection image as shown in FIG. 6. That is, regardless of whether the traveling direction Dv is Dv1 or Dv2, the occurrence of a difference between the vehicle front image (i.e., the actual situation) and the intersection image can be prevented as to on which side of the vehicle 10 a moving object (for example, the pedestrian 2) in the intersection area is located. As described above, according to the image process IP, in the situation shown in FIG. 3A, the intersection image displayed on the display device 23 can be utilized like a reflecting mirror arranged at an actual intersection. Also, by performing the image process IP in addition to the superimposed display of the course image A, the remote operator can more quickly grasp the position (in particular, the position in the left-right direction) of a moving object (for example, the pedestrian 2) present in the intersection area with respect to the vehicle 10.

The invention claimed is:

1. A display control device for controlling image display of a display device for remote operation of a moving body by a remote operator, the display device comprising:
 a first monitor configured to display an intersection image captured by an intersection camera, the intersection camera not being mounted on the moving body and installed at an intersection through which the moving body passes and being configured to image a traffic situation in an area of the intersection;
 one or more sensors configured to acquire intention information of the remote operator regarding right and left turns of the moving body;
 a second monitor configured to display a front center image of a moving body camera configured to capture images in front of the moving body;
 a third monitor configured to display a left front image of the moving body camera;
 a fourth monitor configured to display a right front image of the moving body camera; and
 a processor configured to:
  determine, in accordance with a traveling direction of the moving body in the intersection image and the intention information, a shape of a course image indicating a planned course of the moving body from three of a course image indicating straight ahead, a course image indicating a right turn, and a course image indicating a left turn; and
  display the course image in a superimposed manner on the intersection image while associating the course image with the moving body in the intersection image,
 wherein the intention information is information on a line of sight of the remote operator viewing the second monitor, the third monitor, and the fourth monitor, and
 wherein the processor is further configured to:
  when the remote operator turns the line of sight to the front center image in the second monitor at a time of the moving body entering the intersection, select the course image indicating the straight ahead;

when the remote operator turns the line of sight to the left front image in the third monitor at a time of the moving body entering the intersection, select the course image indicating the left turn; and when the remote operator turns the line of sight to the right front image in the fourth monitor at a time of the moving body entering the intersection, select the course image indicating the right turn.

2. The display control device according to claim 1, wherein the intention information is information indicating that a blinker device operated by the remote operator is in a neutral position, a right-turn indication position, or a left-turn indication position.

3. The display control device according to claim 1, wherein the intention information is information indicating an operating amount of a steering wheel operated by the remote operator.

4. The display control device according to claim 1, wherein the processor is further configured to horizontally flip the intersection image displayed on the first monitor when the moving body enters the intersection from a second direction opposite to a first direction, with respect to the intersection image displayed on the first monitor when the moving body enters the intersection from the first direction.

\* \* \* \* \*